J. C. STEARNS.
STEERING COLUMN SWITCH.
APPLICATION FILED JULY 22, 1915.
1,204,606.
Patented Nov. 14, 1916.
3 SHEETS—SHEET 1.
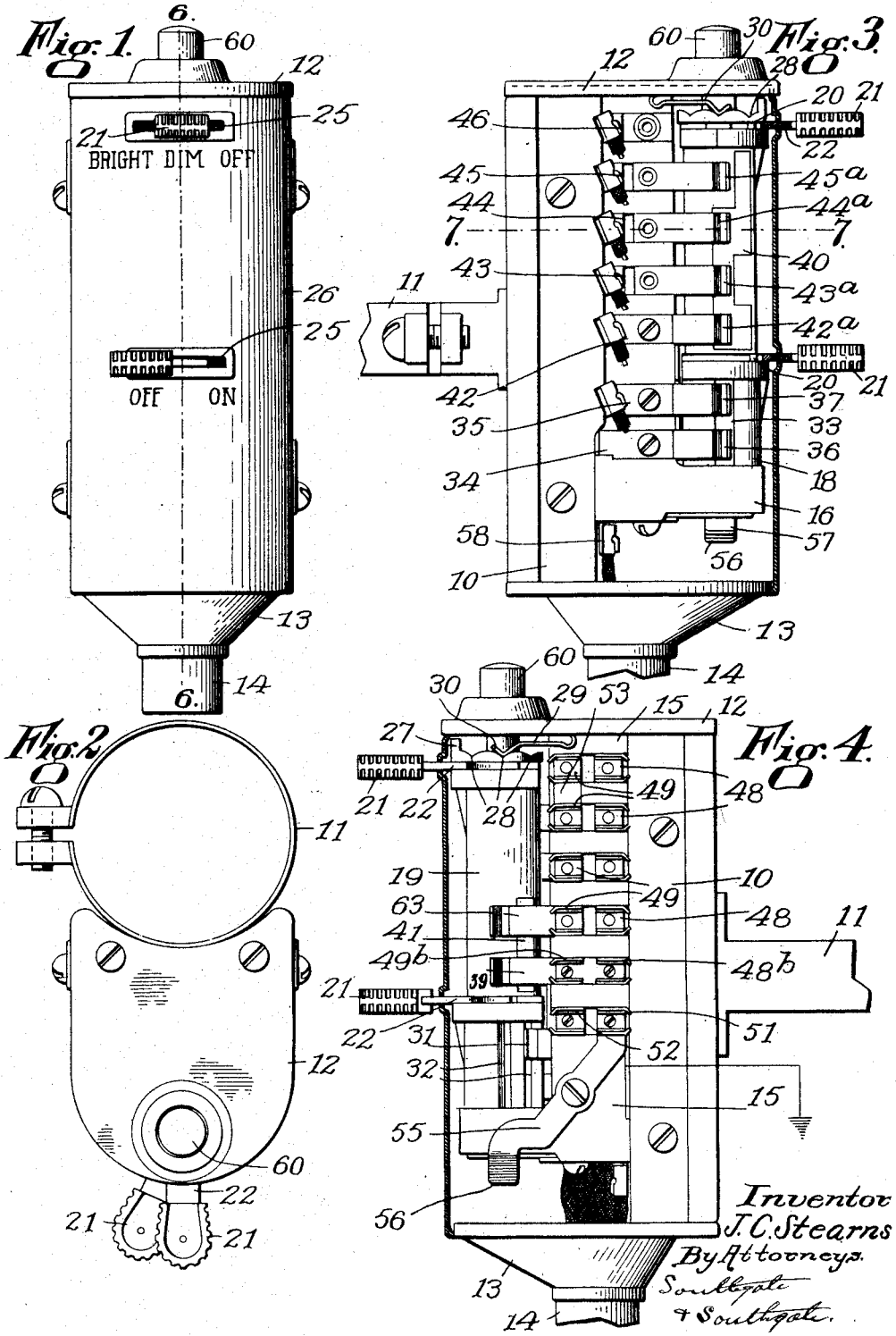
Inventor
J. C. Stearns
By Attorneys
Southgate
& Southgate

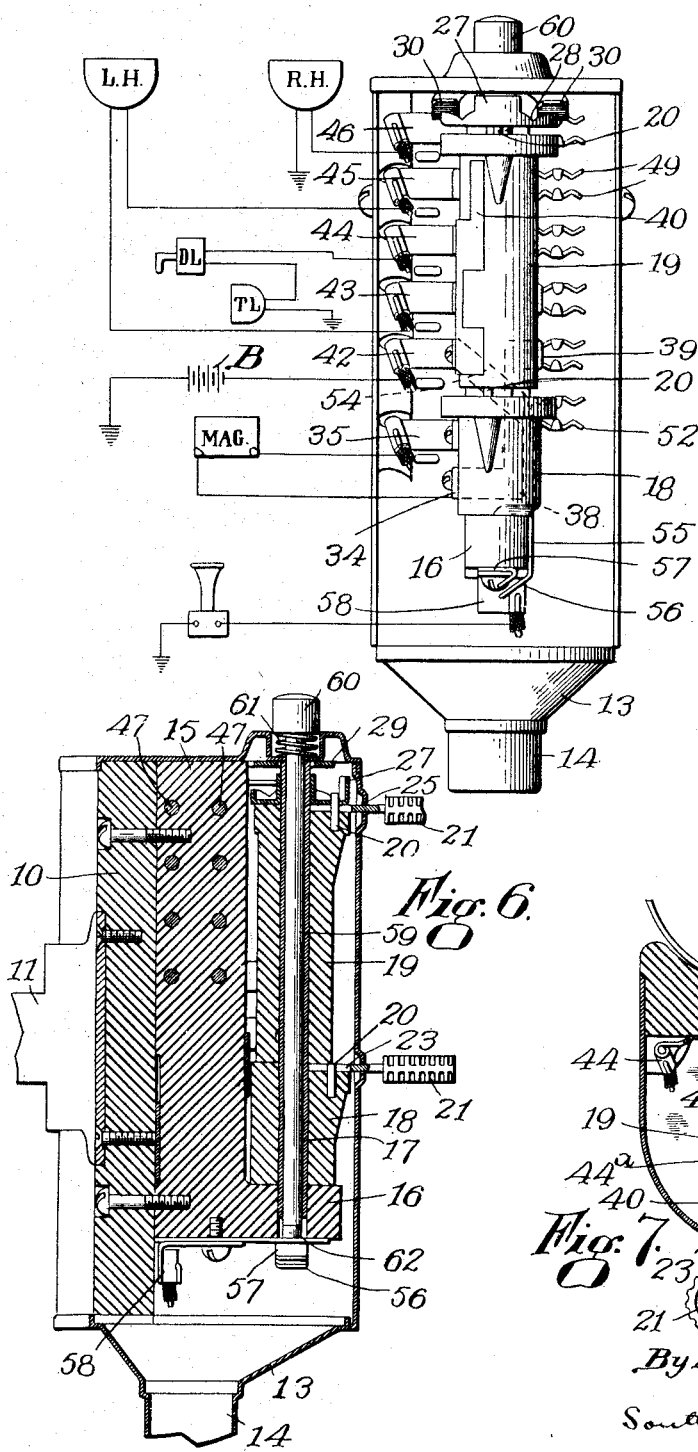

J. C. STEARNS.
STEERING COLUMN SWITCH.
APPLICATION FILED JULY 22, 1915.
1,204,606.
Patented Nov. 14, 1916.
3 SHEETS—SHEET 3.
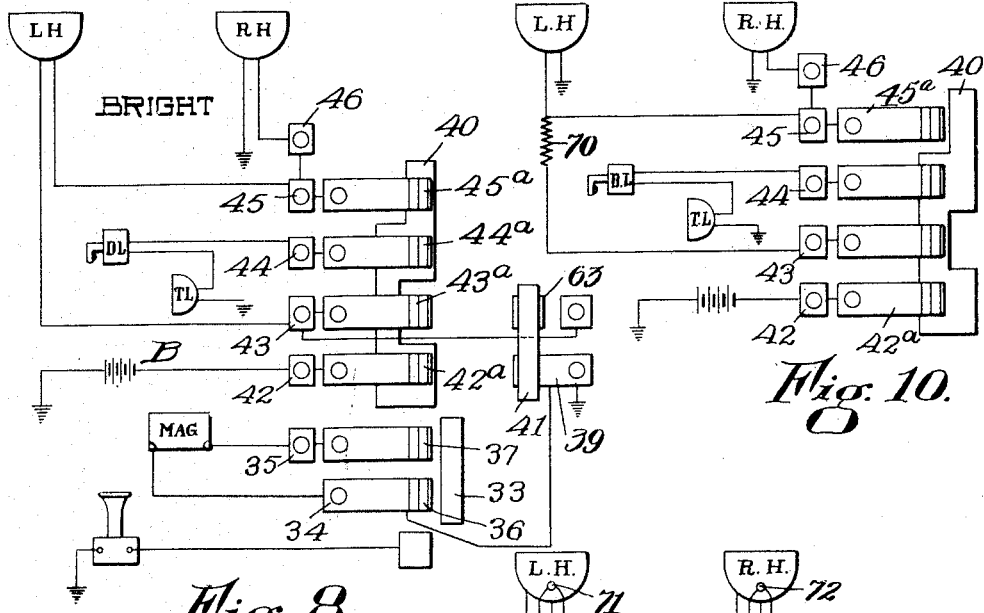
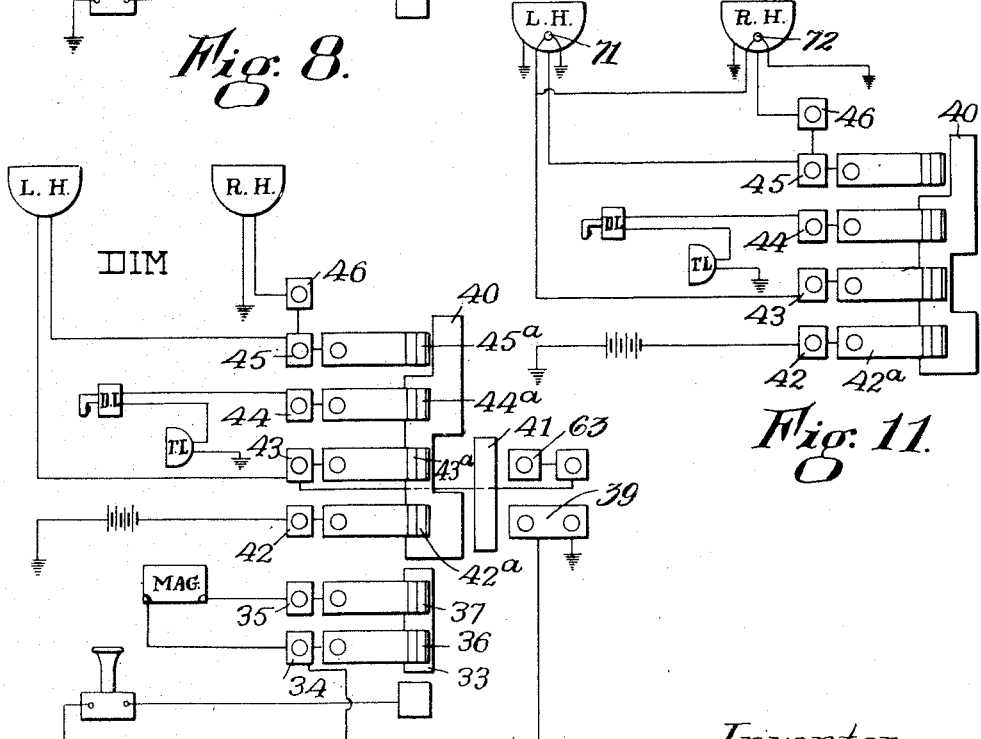
Inventor
J. C. Stearns.
By Attorneys.
Southgate & Southgate.

UNITED STATES PATENT OFFICE.

JASON C. STEARNS, OF WORCESTER, MASSACHUSETTS.

STEERING-COLUMN SWITCH.

1,204,606.  Specification of Letters Patent.  Patented Nov. 14, 1916.

Application filed July 22, 1915. Serial No. 41,416.

*To all whom it may concern:*

Be it known that I, JASON C. STEARNS, a citizen of the United States, residing at Worcester, in the county of Worcester and State of Massachusetts, have invented a new and useful Steering-Column Switch, of which the following is a specification.

This invention relates to an electrical switch, particularly designed for use on automobiles and especially for attachment to the steering column where it will be in a convenient location and will not take up any room in the car which may be needed for other purposes.

The principal objects of the invention are to provide a switch of this character of simple construction and of such a nature that the contacts are rubbing contacts which by the operation of the switch will be kept in bright and operative condition; to provide a convenient construction whereby the handles for operating the switch can be removed readily when the operator leaves the car so as to leave the switch in such a condition that it cannot be operated conveniently by an unauthorized person; to provide a simple and convenient construction by which the headlights can be thrown on or off, or dimmed if desired and at the same time one in which any one of the three methods of dimming ordinarily known can be employed without necessitating any change in the switch itself.

The invention also involves improvements in details of construction and combinations of parts as will appear.

Reference is to be had to the accompanying drawings, in which—

Figure 1 is a front elevation of a steering column switch constructed in accordance with this invention; Fig. 2 is a plan of the same; Fig. 3 is a side view with the removable casing removed; Fig. 4 is a similar view of the other side; Fig. 5 is a front elevation with the removable casing removed and showing some of the wiring diagrammatically; Fig. 6 is a longitudinal central sectional view on the line 6—6 of Fig. 1; Fig. 7 is a sectional view on the line 7—7 of Fig. 3; Fig. 8 is a diagrammatic view of the wiring as used in the case in which the dimming is accomplished by putting the headlights in series and the normal lighting by putting them in parallel, showing the bright position of the parts; Fig. 9 is a similar view showing the dim position; Fig. 10 is a diagram of a portion of the wiring showing the arrangement when a resistance is introduced for dimming the lamps; and Fig. 11 is a similar diagram showing the arrangement when auxiliary lamps are used for dimming.

The invention is shown in a form in which the apparatus involves an insulating back plate 10, preferably of hard rubber, having a metal band 11 on the back for fixing it on the steering column. At the top of the back plate is a sheet metal cover plate 12 and at the bottom a sheet metal member 13 having a tube 14 at the bottom through which the wires are led down to the various elements with which they are connected. On the back plate 10 is an insulating block 15 screwed to this plate and provided with a projection 16 at its lower end in which is journaled the end of a hollow shaft 17 which carries two hard rubber cylinders 18 and 19. The other end of this shaft is journaled in the top plate 12.

The two cylinders 18 and 19 are independently oscillatable on this shaft for the purpose of making and breaking the necessary electrical connections and each of them is provided with a pin 20 at a distance from the shaft. Handle keys 21 are provided, each having a shank 22 provided with a central slot 23 adapted to fit over the pin 20 and with horns 24 adapted to be pressed over the shaft 17. The sides of the slot frictionally engage the pin so as to hold the handle in position. These handles pass through slots 25 in the wall of a removable casing 26 which constitutes the front and the cover of the whole switch. This casing is secured to the side edges of the back plate 10 by screws or the like. It will be understood that in practice these handles are normally forced into position and left there under ordinary circumstances and that when the operator desires to leave the car he can take them out and then any unauthorized person, not familiar with the mechanism, will be unable to start the magneto or the lights.

Fixed with respect to the cylinder 19 at the end thereof is a metal plate 27 having three notches 28 on each side and above this is a U-shaped sheet metal plate 29 having a pair of spring pawls 30 thereon adapted to engage in these notches. This notched plate turns with the cylinder, which consequently is frictionally held in each of its adjusted positions by this double pawl. In the case of the cylinder 19 it is intended to be turned to the three positions indicated by the words "Bright," "Dim" and "Off," preferably on the casing 26.

The cylinder 18 is intended to be moved to two positions only and is held in its two extreme positions by a spring pawl 31 adapted to engage in grooves 32 on the cylinder itself and hold it in its two positions. The cylinder 18 as has been said is preferably made of hard rubber or insulating material but it is provided with a metallic bar 33 thereon extending longitudinally. Mounted on the block 15 is a conductor 34 and a terminal connector 35, both of which, as indicated in Fig. 5, are connected with the terminals of a magneto. Each of these conductors 34 and 35 has a conducting spring 36 and 37 and when the cylinder is turned to the "off" position, they both engage the surface of the connecting bar 33 and are electrically connected with each other. The conductor 34 constitutes the end of a metallic plate 38 which is located mainly under the block 15 and extends along under the same where it is connected with a metallic conducting spring 39 on the other side of the block 15. This plate 38 is mounted so that both these connections are grounded. It will be seen that, without reference to the conducting spring 39, the turning of the cylinder 18 to its "off" position, Fig. 9, short circuits the magneto and turning it to its "on" position, Fig. 8, interrupts the short circuit. This part of the mechanism is operatively independent of the rest of it and is shown completely in Figs. 8 and 9, but not in the other diagrammatic views as it would be just the same in them.

The connections controlled by the cylinder 19 are more complicated. This cylinder is provided with a conducting metallic bar 40, the shape of which is best indicated in the diagrammatic views and in Fig. 3. This is located on one side of the cylinder and on the other side of the cylinder is a straight conducting bar 41. Along the left hand side of the block 15, as shown especially in Fig. 3, are a number of other terminal connectors similar to the connectors 35. These are numbered respectively 42, 43, 44, 45 and 46.

The connector 42 is connected with a wire which extends down through the tube 14 to the battery B which is grounded at the other terminal. The connector 43 is provided with a wire which extends to one side of the left hand headlight L H, the other side of the same being connected with the connector 45. The connector 44 is provided with a wire which extends to the dash light D L and the tail light T L which are in series and grounded on the other side. The connector 46 is provided with a similar wire which extends to one terminal of the right hand headlight R H, the other terminal of which is grounded. It will be understood that this system of wiring and connections can be varied but it corresponds with the form shown in the diagram Figs. 8 and 9, the other diagrams being differently wired.

The connector 42 is provided with a spring 42$^a$ directly secured to it, which is adapted to engage the plate 40 in the two positions of the handle and cylinder which represent the bright and dim positions. It is disconnected therefrom when turned to the "off" position. The other four connectors 43, 44, 45 and 46 are provided with a series of bolts 47 extending clear through the block 15 and connected on the other side with clips 48. Located adjacent to and in alinement with these clips 48 are four similar clips 49. Each pair of clips is designed to receive a fuse so as to complete the respective circuits. These clips 49 are also provided with bolts which extend clear through the block 15 and three of them, the ones thus connected with the connectors 43, 44 and 45 are provided with springs 43$^a$, 44$^a$, and 45$^a$ on the left hand side of the block, which springs are thus, of course, in electrical connection with their respective connectors 43, 44 and 45 and they also bear on the surface of the cylinder 19. The bearing points of four springs 42$^a$, 43$^a$, 44$^a$ and 45$^a$ are shown as in alinement and it will be seen that whenever the battery spring 42$^a$ is in contact with the metallic bar 40, the springs 43$^a$ and 44$^a$ will also be in contact with it and be connected with the battery directly in this way, but the spring 45$^a$ is at that time out of contact with the metallic bar 40 and is consequently insulated by the material of which the cylinder is made. However, if the cylinder is turned to the bright position as indicated in Fig. 8 the springs 42$^a$, 44$^a$ and 45$^a$ are then in contact with this bar 40 while the spring 43$^a$ is insulated from it. The results of these changes will be explained later.

It is to be observed furthermore that the two clips 49 at the upper end of the switch are connected by a metallic plate 53 so that the two connectors 45 and 46 are always in electrical connection with each other. It is for this reason that there is no need of a spring from the terminal 46 bearing on the cylinder 19.

From the connector 42 a metal bar 54 extends diagonally across the top of the block 15 and is connected with a clip 52 corresponding with the other clips 49. This is adapted to be connected by a fuse with a clip 51 to which is connected a metallic bar 55 having an inclined terminal 56 on the end thereof. A spring terminal 57 of a similar shape is mounted on the end of this block 15 and is connected with a terminal connector 58 which is provided with a wire connecting it with a horn, the other terminal of the horn being grounded. Passing longitudinally through the hollow shaft 17 is a plunger 59 having a knob 60 on the upper end and a spring 61 for holding it up, these latter parts being located on the top plate 12. Consequently, the depression of this button causes an insulating member 62 at the end of the plunger to force the spring 57 into contact with the terminal 56 and connects the horn with the battery.

It has been stated that the plate 38 which is grounded is connected with the spring 39. This spring is connected directly with two clips 49<sup>b</sup> and 48<sup>b</sup> and extends up so as to bear on the surface of the cylinder 19 in a position to engage the bar 41 thereon when turned to the right position. There is also a spring 63 adapted at the same time to engage this bar and connected with the first one of the clips 49, that is the one corresponding with the connector 43. This spring of course is connected only to the upper clip, except through the fuse and it is directly connected to the spring 43<sup>a</sup> on the opposite side by that bolt 47 which passes through the block.

Having described the entire construction of the device, I will now proceed to describe its operation with special reference to the diagrams of Figs. 8 and 9. Let it be assumed that the two switch handles 21 are both in their extreme right hand position. In this case the cylinders 18 and 19 are both turned around far enough so that the metal conducting bars 33, 40 and 41 thereon are entirely out of contact with all the contact springs, and consequently all connections are broken. If the lower handle is turned to the left it brings the contact plate 33 thereon into position to be engaged by both of the springs 34 and 35. This completes the magneto circuit in an obvious manner.

Now if the upper handle 21 is turned to its extreme left-hand position the cylinder 19 will be turned around to the position shown in Fig. 8 and a circuit will be made from battery to the connector 42, spring 42<sup>a</sup>, metal bar 40, spring 44<sup>a</sup>, through the fuse and through the connector 44, then through the tail light and dash to the ground, also from the bar 40 to the spring 45<sup>a</sup> through the fuse to the connector 45 where the current divides. Part of it goes through the plate 53 see Fig. 4 to the right hand head light R H and to the ground and the rest goes directly from the connector 45 to the left head light L H, back to the connector 43 over through the fuse to the spring 53 on the other side, connecting bar 41, spring 39, band 11, and to the ground. This, it will be seen, puts the two head lights into the circuit in parallel with each other and causes them to burn with a maximum brightness. At the same time it will be noticed that the connector 42 is connected by the bar 54 with the clip 52 through the fuse and bar 55 to the terminal 56 which can be connected by the terminal 57 operated by the push button to throw the horn into circuit. If, however, the upper handle 21 is left in a position half way between these two the parts will be in the position shown in Figs. 3 and 9. In this case the current from the battery connects the tail light, dash and horn as just described and is also connected by the spring 42<sup>a</sup> with the metal bar 40. But this is directly connected with the spring 43<sup>a</sup> which, through the fuse, is connected with the connector 43, which in turn passes to the left head light L H. The current from that comes back to the connector 45, which in this case, is entirely disconnected from the bar 40 so that it can pass then only through the fuses and plate 53 to the connector 46, and from there to the right head light R H and to the ground. This puts these two lights into circuit in series with each other and causes them to burn dimly. The bar 41 is turned around out of contact with the springs 63 and 39. It will be understood, of course, that this cylinder is held frictionally in its several positions by the ratchet device above described.

In Fig. 10 I have shown a diagram illustrating how the same switch without change can be connected up in a different way for the purpose of dimming the head lights by the introduction of a resistance 70. In this case the bar 41 is not used; it can be thrown out of operation by taking out the fuse connected with the spring 63. However, the connectors 42, 44 and 46 are connected up in the same way as previously described but the connector 43 is connected through the resistance 70 with two wires, one leading to the left head light L H and the other leading to the connector 45 which is connected as above through the fuses and the plate 53 with the connector 46 and the other head light R H. In this case with the parts in the position shown in Fig. 10, the conditions are substantially the same, otherwise, as in Fig. 9; for in this case the current comes from the battery as before and then from the connector 43 through the resistance to the two head light circuits in parallel. These lights will be dimmed because of the resistance. If the cylinder 18 is turned around at the left in the right position it brings the contacts into position shown in Fig. 8, and then the current goes from the battery to the spring 45<sup>a</sup> through the block to the other side through the fuse to the connector 45, and then to the two head lights in parallel, when they will burn brightly because the resistance will not be in circuit.

In Fig. 11 the same switch is shown for use in connection with two auxiliary dim lights 71 and 72 in the head light casings. With the handle thrown over to the left the usual head lights are to be used, and in this case the current goes to the terminal 45 as before and divides, passing through both head lights to the ground, putting the two head lights into circuit in parallel. But when the handle is turned to the intermediate position the connection is made as in the other cases directly from the battery to the terminal 43, which now instead of being connected with the left head light is connected with the auxiliary head lamp 71 in that head light and a branch from this wire also extends to the other auxiliary lamp 72 in the right head light. Both these lamps are grounded and they are put in circuit in parallel in this way.

It will be seen, therefore, that this switch constitutes a convenient arrangement by which any one of these three systems of lighting can be employed and no important changes are required to change from one to the other. At the same time a safe and mechanical device is secured which can be left locked so that an unauthorized person cannot tamper with it and the electrical contacts are kept in good condition on account of the fact that they are caused to rub on each other every time a contact is made.

Although I have illustrated and described only a single form of the invention and shown it as connected up in three ways only, I am aware of the fact that many other modifications can be made therein by any person skilled in the art without departing from the scope of the invention as expressed in the claims. Therefore, I do not wish to be limited to all the details of construction nor to the particular systems of wiring herein shown and described, but What I do claim is:—

1. In an electrical switch, the combination of conducting springs, a cylinder of insulating material, means for turning said cylinder into three different positions, a conducting bar mounted within and flush with the surface of said cylinder in position to engage said springs in certain positions of the cylinder, a plunger extending through the center of said cylinder, an electrical contact adapted to be completed by the depression of said plunger in all positions of the cylinder, an operating circuit connected with one terminal at said electrical contact, and connections to the other terminal whereby said operating circuit will be completed by the depression of said plunger irrespective of the position of the cylinder.

2. In an electrical switch, the combination of a supporting insulating block having conducting springs projecting therefrom, a cylinder of insulating material arranged with its axis parallel to the surface of said block from which the springs project, means for turning said cylinder into three different positions, a conducting bar mounted within and flush with the surface of said cylinder in position to engage said springs in certain positions of the cylinder, a plunger extending through the center of said cylinder, an electrical contact adapted to be completed by the depression of said plunger, a circuit connected with one terminal of said electrical contact, and connections to the other whereby the circuit will be completed by the depression of said plunger.

In testimony whereof I have hereunto set my hand.

JASON C. STEARNS.

Copies of this patent may be obtained for five cents each, by addressing the "Commissioner of Patents, Washington, D. C."